(12) United States Patent
Kondo

(10) Patent No.: US 7,514,479 B2
(45) Date of Patent: Apr. 7, 2009

(54) ACTIVE ENERGY RAY CURABLE COATING COMPOSITION AND MOLDED PRODUCT

(75) Inventor: Satoshi Kondo, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 108 days.

(21) Appl. No.: 11/526,660

(22) Filed: Sep. 26, 2006

(65) Prior Publication Data

US 2007/0082192 A1    Apr. 12, 2007

Related U.S. Application Data

(63) Continuation of application No. PCT/JP2005/005435, filed on Mar. 24, 2005.

(30) Foreign Application Priority Data

Mar. 26, 2004    (JP)    ............... 2004-091995

(51) Int. Cl.
  *C08F 2/46*    (2006.01)
  *C08F 290/12*    (2006.01)
(52) U.S. Cl. ................. 522/116; 522/74; 522/77; 522/83; 522/104; 522/107; 522/90; 522/93; 522/99; 522/113; 522/120; 522/134; 522/135; 522/136; 522/144; 522/139; 522/149; 522/173; 522/174; 522/178; 522/182; 522/179
(58) Field of Classification Search ................. 522/104, 522/106, 107, 90, 93, 99, 113, 116, 120, 522/121, 134, 135, 142, 144, 178, 179, 183, 522/182, 174, 139, 149, 74, 79, 83, 84
See application file for complete search history.

(56) References Cited

U.S. PATENT DOCUMENTS 6,383,641 B1 * 5/2002 Kondou et al. ............... 428/412
6,906,115 B2 * 6/2005 Hanazawa et al. ............ 522/97

FOREIGN PATENT DOCUMENTS

| JP | 61-181809 | | 8/1986 |
| JP | 5-98049 | | 4/1993 |
| JP | 07072721 A | * | 3/1995 |
| JP | 10-81839 | | 3/1998 |
| JP | 11-12495 | | 1/1999 |
| JP | 2001262130 A | * | 9/2001 |
| JP | 2002-173516 | | 6/2002 |
| JP | 2002-194250 | | 7/2002 |
| JP | 2002-241446 | | 8/2002 |
| JP | 2002-256053 | | 9/2002 |
| JP | 2004-43790 | | 2/2004 |
| JP | 2004263144 A | * | 9/2004 |
| WO | WO 03/002628 A1 | | 1/2003 |

* cited by examiner

*Primary Examiner*—Sanza L McClendon
(74) *Attorney, Agent, or Firm*—Oblon, Spivak, McClelland, Maier & Neustadt, P.C.

(57) ABSTRACT

An active energy ray curable coating composition comprising a mixture (A) of compounds each having a (meth)acryloyl group and a colloidal silica (B), wherein the mixture (A) contains from 22 to 62% of a copolymer (A1) having (meth) acryloyl groups and obtained by reacting a specific amount of a radical polymerizable monomer (a1) having a quaternary ammonium salt group, a radical polymerizable monomer (a2) having a hydroxyl group and a radical polymerizable monomer (a3) having a lactone ring-opening addition structure. A molded product having a coating film made of a cured product of the coating composition. To form a coating film made of a cured product which provides excellent abrasion resistance, transparency and antistatic property and undergoes little decrease in the antistatic property even when kept at a high humidity.

9 Claims, No Drawings

ACTIVE ENERGY RAY CURABLE COATING COMPOSITION AND MOLDED PRODUCT

TECHNICAL FIELD

The present invention relates to an active energy ray curable coating composition and a molded product.

BACKGROUND ART

At present, as a plastic product, a resin base material such as a polycarbonate resin; an acrylic resin such as a polymethyl methacrylate; a polyester resin such as polyethylene terephthalate or polybutylene terephthalate; a styrene resin such as an ABS resin, an MS resin or an AS resin; a polyvinyl chloride resin; or a cellulose acetate resin such as triacetyl cellulose, is used for various applications as a base material for containers, instrument panels, packaging materials, variety of housing materials, optical disk substrates, plastic lenses or display devices such as liquid crystal display or plasma display, since such a resin base material is excellent in e.g. light weight properties, easy processability and impact resistance.

However, such a plastic product has a low surface hardness, and thus it is likely to be damaged. Accordingly, a transparent resin such as polycarbonate or polyethylene terephthalate has a drawback such that the transparency or appearance as the essential nature of the resin tends to be remarkably impaired by its repeated use, and such a drawback makes it difficult to use the plastic product especially in a field where the abrasion resistance is required. Accordingly, for the purpose of imparting the abrasion resistance to the surface of the above plastic product, a hard coat material (covering material) is provided. However, a cured layer of a conventional hard coat material has a high specific surface resistance, whereby there will be a drawback that static electricity is likely to be generated. The static electricity generated promotes attachment of dust or grime to the product, thus causing impairment of appearance or transparency of the product.

Accordingly, heretofore, a variety of hard coat materials having antistatic functions have been proposed. For example, as a case wherein it has been attempted to simultaneously achieve antistatic functions and abrasion resistance, an active energy ray curable coating composition containing a (meth) acrylic copolymer having quaternary ammonium salt groups and (meth)acryloyl groups in its molecule (see Patent Document 1), and a composition containing a resin compound having a betain structure and unsaturated groups having radical reactivity in its molecule (see Patent Document 2) have been known. However, it has not been enough in cured products of such compositions to simultaneously satisfy the abrasion resistance, antistatic property and transparency. Especially, even when the cured products were kept at high humidity environment, their antistatic property tended to be lowered due to bleeding of a material which provides the antistatic property.

Further, if a cured layer of a hard coat material having an antistatic performance is formed for the application to a display or an optical disk, there will be many cases where surface lubricity to reduce a load by an external force exerted at the time of cleaning thereby to facilitate cleaning, and fingerprint resistance to prevent adhesion of fingerprints are required.

Patent Document 1: JP-A-2002-194250 (Scope of Claims)
Patent Document 2: JP-A-2004-43790 (Scope of Claims)

DISCLOSURE OF THE INVENTION

Objects to be Accomplished by the Invention

An object of the present invention is to provide a coating composition which can be cured by irradiation with active energy rays to form a coating film made of a cured product, having excellent abrasion resistance, transparency and antistatic property, and particularly undergoing little decrease in the antistatic property even when the cured product is kept at high humidity environment. Further, another object of the present invention is to provide a coating composition which can form a coating film made of a cured product having excellent surface lubricity and/or fingerprint resistance for a long period, in addition to the excellent abrasion resistance, antistatic property and transparency.

Means to Accomplish the Objects

The present invention provides the following coating composition and a molded product having a coating film made of a cured product of the composition.

(1) An active energy ray curable coating composition comprising a mixture (A) of compounds each having a (meth)acryloyl group, and a colloidal silica (B), characterized in that the mixture (A) contains from 22 to 62% of a copolymer (A1) which has a structure in which an isocyanate group of a compound (c) having the isocyanate group and a (meth)acryloyl group in its molecule is addition-reacted with hydroxyl groups of a polymer (b) obtainable by reacting a radical polymerizable monomer mixture (a) comprising a radical polymerizable monomer (a1) having a quaternary ammonium salt group, a radical polymerizable monomer (a2) having a hydroxyl group and a radical polymerizable monomer (a3) having a structure represented by the following formula 1:

$$-(C(=O)C_mH_{2m}O)_n- \qquad \text{Formula 1}$$

(in the formula 1, m is an integer of from 3 to 5, and n is an integer of from 1 to 10), wherein the monomer (a1) is in a proportion of from 20 to 45 parts by mass per 100 parts by mass of the total amount of the monomer mixture (a) and the compound (c), and the isocyanate group of the compound (c) is reacted with 20 to 85 mol % of hydroxyl groups in the monomer mixture (a).

(2) The active energy ray curable coating composition according to the above (1), wherein the colloidal silica (B) is incorporated in an amount of from 0.1 to 500 parts by mass as a solid content, per 100 parts by mass of the mixture (A) of compounds each having a (meth)acryloyl group.

(3) The coating composition according to the above (1) or (2), wherein the mixture (A) of compounds each having a (meth)acryloyl group, contains 0.01 to 10% of a compound (A2) having at least one moiety (α) selected from the group consisting of moieties represented by the following formulae 2 to 6 and at least one moiety (β) selected from the group consisting of moieties represented by the following formulae 7 to 9, in its molecule:

$$-(SiR^1R^2O)_p- \qquad \text{Formula 2}$$

$$-(CF_2CF_2O)_q- \qquad \text{Formula 3}$$

$-(CF_2CF(CF_3)O)_r-$  Formula 4

$-(CF_2CF_2CF_2O)_s-$  Formula 5

$-(CF_2O)_t-$  Formula 6

(in the formula 2, each of $R^1$ and $R^2$ which are independent of each other, is a $C_{1-8}$ alkyl group, a $C_{1-8}$ fluoroalkyl group or a phenyl group, p is an integer of from 1 to 1000, and in the formulae 3 to 6, q, r, s and t are integers of from 1 to 100, respectively)

$-R^3-$  Formula 7

$-(CH_2CH_2O)_x-(CH_2CH(CH_3)O)_y-$  Formula 8

$-(C(=C)C_uH_{2u}O)_z-$  Formula 9

(in the formula 7, $R^3$ is a $C_{6-20}$ alkylene group, in the formula 8, x is an integer of from 0 to 100, y is an integer of from 0 to 100 and $5 \leq x+y \leq 100$, and in the formula 9, u is an integer of from 3 to 5 and z is an integer of from 1 to 20).

(4) A molded product which comprises a substrate and a coating film with a thickness of from 0.1 μm to 50 μm, made of a cured product of the coating composition as defined in any one of the above (1) to (3), formed on the surface of the substrate.

EFFECT OF THE INVENTION

The coating film made of a cured product of the coating composition of the present invention simultaneously provides excellent abrasion resistance, antistatic property and transparency, and particularly undergoes little decrease in the antistatic property even when kept at a high humidity.

Further, in a case where the coating composition contains the compound (A2) of the present invention, it is possible to impart surface lubricity and/or fingerprint resistance to the coating film made of the cured product over a long period.

BEST MODE FOR CARRYING OUT THE INVENTION

In the present specification, an acryloyl group and a methacryloyl group are generically referred to as a (meth)acryloyl group, an acrylate and a methacrylate are generically referred to as a (meth)acrylate, and acrylic acid and methacrylic acid are generically referred to as (meth)acrylic acid.

In the coating composition of the present invention, a mixture (A) of compounds each having a (meth)acryloyl group (hereinafter referred to also as the mixture (A)) represents a copolymer (A1) having quaternary ammonium salt groups, hydroxyl groups, structures represented by the following formula 1 and (meth)acryloyl groups (hereinafter referred to also as the copolymer (A1)), and a compound having a (meth) acryloyl group, which is other than the copolymer (A1).

From 22 to 62% of the mixture (A) is a copolymer (A1) which has a structure in which an isocyanate group of a compound (c) having the isocyanate group and a (meth)acryloyl group in its molecule is addition-reacted with hydroxyl groups of a polymer (b) obtainable by reacting a radical polymerizable monomer mixture (a) comprising a radical polymerizable monomer (a1) having a quaternary ammonium salt group, a radical polymerizable monomer (a2) having a hydroxyl group and a radical polymerizable monomer (a3) having a structure represented by the following formula 1:

$-(C(=O)C_mH_{2m}O)_n-$  Formula 1

(in the formula 1, m is an integer of from 3 to 5, and n is an integer of from 1 to 10).

The copolymer (A1) has quaternary ammonium salt groups and hydroxyl groups, whereby the antistatic property is maintained, and said copolymer (A1) has (meth)acryloyl groups, whereby the curing reaction with other compounds in the mixture (A) is carried out by irradiation with an active energy ray, thus preventing bleeding of the copolymer (A1).

The structure represented by the above formula 1 represents a ring-opened adduct of lactone. The copolymer (A1) has structures represented by the formula 1, whereby its compatibility with other compounds in the mixture (A) improves and a coating film made of a cured product of the coating composition provides excellent transparency. The type of the lactone is not particularly limited, but in view of the availability and the easiness of ring-opening addition, ε-caprolactone (in the formula 1, corresponding to m=5) is preferred. Further, in the formula 1, n represents an average polymerization degree of lactone. If n exceeds 10, the crystallinity increases, whereby the transparency of the coating film made of a cured product is decreased, such being undesirable. n is preferably at most 5. Further, in view of the particularly excellent transparency of the coating film, n is preferably at least 2.

The proportion of the monomer (a1) is from 20 to 45 parts by mass per 100 parts by mass of the total amount of the monomer mixture (a) and the compound (c). The above numerical value range relates to the proportion of monomer units having a quaternary ammonium salt group in the copolymer (A1). The lower limit is preferably at least 23 parts by mass, and the upper limit is preferably at most 40 parts by mass. If it is less than 20 parts by mass, the copolymer (A1) may fail to provide a sufficient antistatic property. On the other hand, if it is more than 45 parts by mass, the hydrophilicity of the copolymer (A1) tends to be too high, whereby the compatibility with other components in the coating composition tends to decrease thus impairing the transparency of the cured product, or a problem such as whitening of the cured product is likely to result at a high humidity.

The copolymer (A1) is one having an isocyanate group of the compound (c) reacted to from 20 to 85 mol % of hydroxyl groups in the monomer mixture (a). The lower limit of the above numerical value range is more preferably at least 30 mol %, besides particularly preferably at least 40 mol %, and the upper limit is more preferably at most 80 mol %, besides particularly preferably at most 75 mol %. The above numerical value range relates to the amount of (meth)acryloyl groups introduced into the copolymer (A1) and the amount of remaining hydroxyl groups. When the above numerical value is high, namely, when the amount of (meth)acryloyl groups introduced is large, covalent bonds will sufficiently be formed with other components at the time of curing the coating composition, whereby bleeding resistance of the copolymer (A1) at a high humidity will be good. If the above numerical value is low, namely, if the amount of (meth)acryloyl groups introduced is small, the bleeding resistance of the copolymer (A1) at a high humidity will decline. On the other hand, it has been found that when the above numerical value is high, the amount of the remaining hydroxyl groups becomes small, but the development of the antistatic property of the copolymer (A1) tends to decline. The reason is not clearly understood, but is considered to be attributable to lowering of the mobility of anions as counter ions of the quaternary ammonium salt groups, in accordance with the lowering of the concentration of the hydroxyl groups. When it is within the above numerical value range, the bleeding resistance and the antistatic property of the copolymer (A1) at a high humidity can suitably be consistent.

The copolymer (A1) can be obtained by the following two methods:

(1) A method of reacting a radical polymerizable monomer mixture (a) comprising a radical polymerizable monomer (a1) having a quaternary ammonium salt group, a radical polymerizable monomer (a2) having a hydroxyl group and a radical polymerizable monomer (a3) having a structure represented by the formula 1, to obtain a polymer (b), followed by adding an isocyanate group of a compound (c) having the isocyanate group and a (meth)acryloyl group in its molecule to hydroxyl groups of the polymer (b).

(2) A method of reacting a radical polymerizable monomer mixture (a) comprising a radical polymerizable monomer (a1') having a tertiary amino group, a radical polymerizable monomer (a2) having a hydroxyl group and a radical polymerizable monomer (a3) having a structure represented by the formula 1, to obtain a polymer (b'), adding an isocyanate group of a compound (c) having the isocyanate group and a (meth)acryloyl group in its molecule to hydroxyl groups of the polymer (b'), followed by adding an alkylating agent (d) to the tertiary amino groups of the polymer.

The radical polymerizable monomer mixture (a) comprehensively represents the following radical polymerizable monomers (a1) to (a4), and is meant for monomers having a radical polymerizable unsaturated bond such as a (meth)acryloyl group, a vinyl group or an allyl group.

The radical polymerizable monomer (a1) having a quaternary ammonium salt group can be prepared by preliminarily reacting a radical polymerizable monomer (a1') having a tertiary amino group and an alkylating agent (d), as mentioned below. The smaller, the alkyl group on the nitrogen atom is, the better the antistatic property tends to be, and therefore it is preferably 2-methacryloyloxyethyl trimethylammonium chloride having N,N-dimethylaminoethyl (meth)acrylate formed into a quaternary salt by using methyl chloride.

The radical polymerizable monomer (a1') having a tertiary amino group may, for example, be an ester of (meth)acrylic acid with an N,N-dialkylaminoalkyl alcohol, specifically N,N-dimethylaminoethyl(meth)acrylate, N,N-dimethylaminobutyl(meth)acrylate, N,N-diethylaminoethyl methacrylate or N,N-dibutylaminoethyl methacrylate. The smaller the alkyl group on the nitrogen atom is, the better the antistatic property tends to be, and therefore it is particularly preferably N,N-dimethylaminoethyl(meth)acrylate.

The radical polymerizable monomer (a2) having a hydroxyl group is preferably a radical polymerizable monomer having an alcoholic hydroxyl group, and 2-hydroxyethyl (meth)acrylate, 2-hydroxypropyl(meth)acrylate, 2-hydroxybutyl(meth)acrylate, 2-hydroxy-3-phenoxypropyl(meth)acrylate or 3-chloro-2-hydroxypropyl(meth)acrylate may, for example, be mentioned.

The radical polymerizable monomer (a3) having a structure represented by the following formula 1 is preferably one obtainable by a ring-opening addition reaction of lactone to the above monomer (a2):

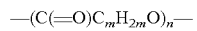
—(C(=O)C$_m$H$_{2m}$O)$_n$—         Formula 1

(in the formula 1, m is an integer of from 3 to 5, and n is an integer of from 1 to 10)

For example, a compound having ε-caprolactone added to 2-hydroxyethyl acrylate may be mentioned. Further, in a case where the monomer (a3) also has a hydroxyl group, the use of the monomer (a3) is considered to be the use of both monomer (a2) and monomer (a3), and the molar amount of a hydroxyl group in the monomer mixture (a) is considered to include also the molar amount of a hydroxyl group of the monomer (a3).

The radical polymerizable monomer mixture (a) may also contain another radical polymerizable monomer (a4) copolymerizable with the monomer (a1), monomer (a1'), monomer (a2) and monomer (a3). Such another radical polymerizable monomer (a4) may, for example, be a (meth)acrylate, a (meth)acrylamide, a hydrocarbon type olefin, a vinyl ether, an isopropenyl ether, an allyl ether, a vinyl ester or an allyl ester. For example, an alkyl (meth)acrylate represented by the formula $CH_2=C(R^4)COOC_kH_{2k+1}$ ($R^4$ is a hydrogen atom or a methyl group, k is an integer of from 1 to 13, and $C_kH_{2k+1}$ may be linear or branched), allyl(meth)acrylate, benzyl (meth)acrylate, butoxyethyl (meth)acrylate, 2-cyanoethyl (meth)acrylate, cyclohexyl (meth)acrylate, 2,3-dibromopropyl (meth)acrylate, 2-ethoxyethyl (meth)acrylate, 2-(2-ethoxyethoxy)ethyl (meth)acrylate, 2-ethylhexyl(meth)acrylate, glycidyl(meth)acrylate, γ-(meth)acryloxypropyl trimethoxysilane, 2-methoxyethyl (meth)acrylate, (meth)acryloylmorpholine or isobornyl acrylate may be mentioned.

The compound (c) having a (meth)acryloyl group and an isocyanate group in its molecule is preferably 2-(meth)acryloyloxyethyl isocyanate in view of e.g. availability. In addition, for example, an adduct in a molar ratio of 1:1 of an acrylate having a hydroxyl group, such as 2-hydroxyethyl acrylate, 2-hydroxypropyl acrylate, 2-hydroxy-3-phenoxypropyl acrylate, 4-hydroxybutyl acrylate, 3-hydroxypropyl acrylate, 2-hydroxyethyl acrylate modified with caprolactone, 2-acryloyloxyethyl-2-hydroxyethyl phthalic acid, pentaerythritol triacrylate or dipentaerythritol pentaacrylate with an isocyanate compound such as tolylene diisocyanate, isophorone diisocyanate, xylylene diisocyanate or hexamethylene diisocyanate, may be mentioned.

The alkylating agent (d) may, for example, be an alkyl halide such as methyl chloride, butyl chloride, methyl bromide or methyl iodide, a halide such as benzyl chloride, methyl chloroacetate or ethyl chloroacetate, an alkyl sulfate such as dimethyl sulfate or diethyl sulfate, or a sulfonate such as p-toluene methylsulfonate or benzene methylsulfonate.

The radical polymerizable monomer mixture (a) is polymerized using a usual radical polymerization initiator in a solvent. In the case of polymerization of a radical polymerizable monomer mixture (a) containing a radical polymerizable monomer (a1') having a tertiary amino group, the solvent may, for example, be an aromatic hydrocarbon such as toluene or xylene, an ester such as ethyl acetate, propyl acetate or butyl acetate, a ketone such as acetone, methyl ethyl ketone, methyl isobutyl ketone or cyclohexanone, an ether such as ethylene glycol dimethyl ether, ethylene glycol diethyl ether or diethylene glycol dimethyl ether, or an ether ester such as 2-methoxyethyl acetate, 2-ethoxyethyl acetate or 2-butoxyethyl acetate, or they may be used in combination. On the other hand, in the case of polymerization of a radical polymerizable monomer mixture (a) comprising a radical polymerizable monomer (a1) having a quaternary ammonium salt group, the solubility of the monomer (a1) in solvents as mentioned above is quite low, and therefore it is preferred to use a polar solvent having active hydrogen in its molecule, such as water, methanol, ethanol, propanol or ethylene glycol.

As the radical polymerization initiator to be used in the polymerization of a radical polymerizable monomer mixture (a), an azo compound such as 2,2'-azobisisobutyronitrile, 2,2'-azobis(2,4-dimethylvaleronitrile), 2,2'-azobis(4-methoxy-2,4-dimethylvaleronitrile) or 2,2'-azobis(2-methylbutyronitrile), or an organic peroxide such as benzoyl peroxide, di-t-butyl peroxide or cumene hydroperoxide is suitably used. The polymerization initiator is used in an amount of preferably from 0.1 to 20 mol %, more preferably from 1 to 10 mol %, based on the total molar amount of the radical polymerizable monomer mixture (a).

In the polymerization, a chain transfer agent may be used for the purpose of adjusting the molecular weight as the case requires. The chain transfer agent is not particularly limited, but is preferably a thiol type compound such as ethyl mercaptan, octyl mercaptan or stearyl mercaptan. The chain transfer agent is used in an amount of preferably from 0.1 to 20 mol %, more preferably from 1 to 10 mol %, based on the total molar amount of the radical polymerizable monomer mixture (a).

In the reaction of the polymer (b) and the compound (c), an isocyanate group of the compound (c) is reacted with active hydrogen, and therefore, it is required that the reaction is carried out in a solvent having no active hydrogen of e.g. a hydroxyl group, a carboxyl group or an amino group in its molecule. In the reaction of the compound (c) and the polymer (b') obtainable by reacting a radical polymerizable monomer mixture (a) essentially containing a radical polymerizable monomer (a1') having a tertiary amino group, it is possible to use the solvent used in the polymerization, as it is. On the other hand, after the polymerization of the radical polymerizable monomer mixture (a) essentially containing the radical polymerizable monomer (a1) having a quaternary ammonium salt group, the resulting polymer (b) has a structure represented by the above formula 1, whereby the solubility in a solvent having no active hydrogen in its molecule also improves. Accordingly, the polar solvent having active hydrogen in its molecule, used as a polymerization solvent, may be subjected to solvent substitution by a solvent having no active hydrogen in its molecule, and then reacted with the compound (c).

The addition reaction of the hydroxyl groups of the polymer (b) and the isocyanate group of the compound (c) may be completed by stirring the polymer (b) and the compound (c) for 1 to 24 hours at a temperature of from room temperature to 60° C. For the purpose of accelerating the addition reaction, a catalyst such as dibutyltin dilaurate may be added thereto. In the present reaction, for the purpose of preventing polymerization of a (meth)acryloyl group of the compound (c) during the reaction, it is preferred to use a polymerization inhibitor such as 2,6-di-t-butyl-p-cresol or 4-methoxyphenol. The amount to be used is preferably from 0.01 to 2%, more preferably from 0.05 to 1.5% to the reaction mixture.

The reaction for adding the alkylating agent (d) to the tertiary amino groups of the polymer (b') obtained by copolymerizing the radical polymerizable monomer mixture (a) essentially containing the radical polymerizable monomer (a1') having a tertiary amino group, may be completed by adding the alkylating agent (d) in a molar amount equivalent to the tertiary amino groups, followed by stirring the polymer (b') and the alkylating agent (d) for 1 to 24 hours at a temperature of from room temperature to 60° C.

The molecular weight of the copolymer (A1) is not particularly limited, but is preferably from 1,000 to 100,000, more preferably from 2,000 to 50,000, as a weight average molecular weight of the copolymer (A1). If it exceeds 100,000, the crystallinity of the copolymer (A1) increases, whereby the transparency of a coating film made of a cured product of the coating composition is likely to decrease. Further, if it is less than 1,000, bleeding is likely to occur at a high humidity. Further, the weight average molecular weight in the present invention is measured by gel permeation chromatography (GPC) as calculated as polystyrene.

The mixture (A) contains from 22 to 62% (by mass) of the copolymer (A1). If the content is less than 22%, a coating film made of a cured product of the coating composition will be poor in the antistatic property. If it exceeds 62%, the coating film made of a cured product of the coating composition will be poor in the abrasion resistance, whereby bleeding of the copolymer (A1) occurs at a high humidity.

It is preferred that the compound (A2) is incorporated in the mixture (A) of compounds each having a (meth)acryloyl group. The compound (A2) has at least one moiety (α) selected from the group consisting of moieties represented by the following formulae (2) to (6) and at least one moiety (β) selected from the group consisting of moieties represented by the following formulae (7) to (9) in its molecule:

  Formula 2

  Formula 3

  Formula 4

  Formula 5

  Formula 6

(in the formula 2, each of $R^1$ and $R^2$ which are independent of each other, is a $C_{1-8}$ alkyl group, a $C_{1-8}$ fluoroalkyl group or a phenyl group, p is an integer of from 1 to 1,000, and in the formulae 3 to 6, q, r, s and t are integers of from 1 to 100, respectively)

  Formula 7

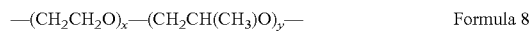  Formula 8

  Formula 9

(in the formula 7, $R^3$ is a $C_{6-20}$ alkylene group, in the formula 8, x is an integer of from 0 to 100, y is an integer of from 0 to 100 and $5 \leq x+y \leq 100$, and in the formula 9, u is an integer of from 3 to 5 and z is an integer of from 1 to 20).

When the compound (A2) has a moiety (α) selected from moieties represented by the above formula 2, it is possible to impart surface lubricity to a coating film made of a cured product of the coating composition. In the above formula 2, each of $R^1$ and $R^2$ may be the same or different in every siloxane unit. The portion represented by the formula 2 is preferably a polydimethylsilicone unit, a polymethylphenylsilicone unit, a polydiphenylsilicone unit, a polyfluoroalkylsilicone unit wherein $R^1$ and/or $R^2$ is $R^fCH_2CH_2CH_2$— ($R^f$ is a polyfluoroalkyl group), or the like. Such an $R^f$ group is a group having two or more hydrogen atoms in an alkyl group substituted by fluorine atoms. In the formula 2, p is from 1 to 1,000, preferably from 1 to 500. When p is within this range, the coating film made of the cured product is excellent in surface lubricity.

When the compound (A2) has at least one moiety (α) selected from the group consisting of moieties represented by the above formulae 3 to 6, it is possible to impart surface lubricity and/or fingerprint resistance to the coating film made of the cured product of the coating composition. In the above formulae 3 to 6, when p, q, r and s are integers of from 1 to 4, respectively, fingerprint resistance tends to be observed, and when they are from 5 to 100, respectively, both functions of surface lubricity and fingerprint resistance are expected to be observed.

When the compound (A2) has at least one moiety (β) selected from the group consisting of moieties represented by the formulae 7 to 9, such a compound (A2) has a function to provide compatibility with other compounds in the mixture (A).

The moiety represented by the above formula 7 is an alkylene group having a carbon number of from 6 to 20, which may have a straight or branched chain structure. When the carbon number is within this range, the compatibility of the compound (A2) with other compounds in the mixture (A) will be proper, and further, the crystallinity of the group will not be too strong, and thus the coating film made of the cured product will be excellent in transparency.

The moiety represented by the above formula 8 represents a random copolymer of ethylene oxide and propylene oxide, a block copolymer of ethylene oxide and propylene oxide, a homopolymer of ethylene oxide or a homopolymer of propylene oxide. As x and y each representing an average polymerization degree, x is an integer of from 0 to 100, y is an integer of from 0 to 100, and $5 \leq x+y \leq 100$. Further, as x and y, it is preferred that x is an integer of from 0 to 80, y is an integer of from 0 to 80 and $5 \leq x+y \leq 80$. When x and y are within such ranges, the compound (A2) has proper compatibility with other compounds in the mixture (A), and thus the coating film made of the cured product will be excellent in transparency. When x+y exceeds 100, the compatibility of the compound (A2) with other compounds in the mixture (A) tends to be too high, whereby the compound (A2) will hardly segregate on the surface of the coating film, and thus the coating film made of the cured product will not have sufficient surface lubricity and/or fingerprint resistance. On the other hand, when x+y is less than 5, the compatibility of the compound (A2) with other compounds in the mixture (A) tends to be low, thus impairing the transparency of the coating film made of the cured product.

The moiety represented by the above formula 9 represents a ring-opening moiety of a lactone. z representing the average polymerization degree is an integer of from 1 to 20. When t is within this range, the crystallinity of the moiety (β) is suppressed, whereby the transparency of the coating film made of the cured product is excellent.

The compound (A2) has a (meth)acryloyl group, whereby it undergoes a curing reaction by irradiation with active energy rays to form a covalent bond with other components in the coating composition. Thus, the compound (A2) is present as fixed on the surface of the coating film made of the cured product of the coating composition, and the compound (A2) does not vanish from the surface of the coating film. Accordingly, the surface of the coating film made of the cured product can provides surface lubricity and/or fingerprint resistance over a long period.

The bonding form of the moiety (α), the moiety (β) and the (meth)acryloyl group in the compound (A2) is not particularly limited. As the bonding form of the respective moieties in the compound (A2), specifically, the following examples may be preferably mentioned.

(1) Straight chain type: A type wherein the moiety (α), the moiety (β) and the (meth)acryloyl group are linearly connected. For example, the following compounds may be mentioned.

Straight chain type:

1: 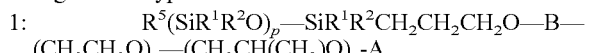

2: 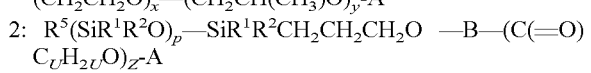

3: $R^fO-(CF_2CF_2O)-CF_2CH_2O-B-(CH_2CH_2O)_x-(CH_2CH(CH_3)O)_y-A$

4: $R^fO-(CF_2CF_2O)_q-CF_2CH_2O-B-(C(=O)C_UH_{2U}O)_Z-A$

5: $R^fO-(CF_2CF_2O)_q-(CF_2O)_t-CF_2CH_2O-B-(CH_2CH_2O)_x-(CH_2CH(CH_3)O)_y-A$

6: $R^fO-(CF_2CF_2O)_q-(CF_2O)_t-CF_2CH_2O-B-(C(=O)C_UH_{2U}O)_Z-A$

7: $R^fO-(CF(CF_3)CF_2O)_r-CF(CF_3)CH_2O-B-(CH_2CH_2O)_x-(CH_2CH(CH_3)O)_y-A$

8: $R^fO-(CF(CF_3)CF_2O)_r-CF(CF_3)CH_2O-B-(C(=O)C_UH_{2U}O)_Z-A$

9: $R^fO-(CF_2CF_2CF_2O)_s-CF_2CF_2CH_2O-B-(CH_2CH_2O)_x-(CH_2CH(CH_3)O)_y-A$

10: $R^fO-(CF_2CF_2CF_2O)_s-CF_2CF_2CH_2O-B-C(=O)C_UH_{2U}O)_Z-A$

In the above,

A: $-CONH-CH_2CH_2OCOC(R^4)=CH_2$ ($R^4$ is $-H$ or $-CH_3$),

B: single bond, $-CH_2CH_2O-$, $-CONH-C_6H_4-CH_2-C_6H_4-NHCOO-$, $-CONH-CH_2CH_2CH_2CH_2CH_2CH_2-NHCOO-$, $-CONH-C_6H_3(CH_3)-NHCOO-$, $-CONH-C_{10}H_6-NHCOO-$, $-CO-C_6H_4-COO-$, $-CO-C_iH_{2i+1}-COO-$ (i is an integer of from 0 to 10), $R^4$: Hydrogen atom or methyl group, $R^5$: $C_{1-8}$ alkyl group (which may contain an etheric oxygen atom), $R^f$: $C_{1-16}$ fluoroalkyl group (which may contain an etheric oxygen atom), $R^1$, $R^2$, p, q, r, s, t, u, x, y and z are as defined above. The arrangement of $-(CF_2CF_2O)-$ units and $-(CF_2O)-$ units may be a block-form or a random-form.

The raw material compound forming the moiety (α) may be a compound having the moiety (α) and having its terminal modified with a hydroxyl group. For example, a polymer such as polydimethylsilicone, polyhexafluoropropylene oxide or polytetrafluoroethylene oxide having its terminal modified with a hydroxyl group, may preferably be mentioned.

By polymerizing a monomer such as ethylene oxide, propylene oxide or lactone to the terminal hydroxyl group of the compound having the above moiety (α) and having its terminal modified with the hydroxyl group, the moiety (β) can be constituted adjacently to the moiety (α). Otherwise, a polymer such as polyethylene glycol or polypropylene glycol is subjected to formation of a polyurethane bond by mean of e.g. a bifunctional isocyanate, thereby to have the moiety (β) connected to the moiety (α).

In the operation so far, the terminal of the moiety (β) is a hydroxyl group. A method of introducing a (meth)acryloyl group thereto, may, for example, be a method of introducing it by means of an ester linkage using e.g. (meth)acrylic acid or (meth)acrylic acid chloride, a method of introducing it by means of a urethane bond using 2-(meth)acryloyloxyethyl isocyanate, or a method of introducing e.g. 2-hydroxyethyl (meth)acrylate, 3-hydroxypropyl(meth)acrylate or 4-hydroxybutyl(meth)acrylate via a urethane bond by means of a bifunctional isocyanate.

Further, a method may also be mentioned wherein one having one terminal of a polymer such as polyethylene glycol or polypropylene glycol modified with a (meth)acryloyl group, is used and bonded to the hydroxyl group at the terminal of the moiety (α) by means of a urethane bond using e.g. a bifunctional isocyanate to connect the moiety (β) and a (meth)acryloyl group adjacently to the moiety (α) all at once.

(2) Copolymerization type: A type wherein a radical polymerizable macromer having the moiety (α) and a radical polymerizable macromer having the moiety (β) may be prepared, and such macromers are copolymerized, followed by introducing a (meth)acryloyl group. For example, the following compounds may be mentioned. Copolymerization type:

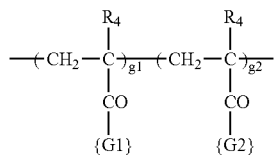

[G1]: $R^5(SiR^1R^2O)_p$—$SiR^1R^2CH_2CH_2CH_2O$—$R'O$—$(CF_2CF_2O)_q$—$CF_2CH_2O$—$CONH$—$CH_2CH_2O$—, $R'O$—$(CF_2CF_2O)_q$—$(CF_2O)_r$—$CF_2CH_2O$—$CONH$—$CH_2CH_2O$—, $R'O$—$(CF(CF_3)CF_2O)$, —$CF(CF_3)CH_2O$—$CONH$—$CH_2CH_2O$—, $R'O$—$(CF_2CF_2CF_2O)_s$ —$CF_2CF_2CH_2O$—$CONH$—$CH_2CH_2O$—

[G2]: $CH_2=C(R^4)COOCH_2CH_2$—$NHCOO$—$(CH_2CH_2O)_x$—$(CH_2CH(CH_3)O)_y$—, $CH_2=C(R^4)COOCH_2CH_2$—$NHCOO$—$(C(=O)C_uH_{2u}O)_z$—$CH_2CH_2O$—,

In the above, g1 is from 1 to 20, g2 is from 1 to 20, and $R'$, $R^1$, $R^2$, $R^4$, $R^5$, p, q, r, s, t, u, x, y and z are as defined above.

The macromer having the moiety (α) may, for example, be a compound having one terminal of a polymer such as polydimethylsilicone, polyhexafluoropropylene oxide or polytetrafluoroethylene oxide modified with a (meth)acryloyl group.

The macromer having the moiety (β) may, for example, be a compound having one terminal of a polymer such as an alkyl ester of (meth)acrylic acid, polyethylene glycol, polypropylene glycol or a ring-opening moiety of lactone modified with a (meth)acryloyl group.

The (meth)acryloyl group may be introduced to the terminal of the copolymer of the above macromers. For example, a method of introducing it to a terminal hydroxyl group of the copolymer of the above macromers, by means of an ester linkage using e.g. (meth)acrylic acid or (meth)acrylic acid chloride, or a method of introducing it by means of a urethane bond using 2-(meth)acryloyloxyethyl isocyanate, may be mentioned.

The compound (a2) is preferably from 0.01 to 10% (by mass), more preferably from 0.1 to 5%, of the mixture (A) of compounds each having a (meth)acryloyl group. If it is within the above range, when the coating composition is applied on the substrate surface, the compound (A2) segregates on the surface of the coating film without impairing transparency of the coating film before curing. Thus, transparency of the coating film after curing will not be impaired, and further the surface of the coating film will be excellent in surface lubricity and/or fingerprint resistance. Further, if it is within the above range, the curing property of the coating composition does not decrease, and the compound (A2) is present as fixed on the surface of the coating film during curing. Therefore, the surface of the coating film can provide excellent surface lubricity and/or fingerprint resistance over a long period.

In the mixture (A) of compounds each having a (meth)acryloyl group, a compound having a (meth)acryloyl group other than the copolymer (A1) and the compound (A2) is preferably a compound (A3) having two or more (meth)acryloyl groups in its molecule, from the viewpoint of excellent abrasion resistance of the coating film made of the cured product of the coating composition.

The compound (A3) has preferably from 2 to 50 (meth)acryloyl groups, more preferably from 3 to 30 (meth)acryloyl groups.

The compound (A3) may, for example, be a polyfunctional compound which is acrylurethane as a reaction product of pentaerythritol or polypentaerythritol as an oligomer thereof, a polyisocyanate and a hydroxyalkyl (meth)acrylate, and which has at least 2, more preferably from 4 to 20, (meth)acryloyl groups, or a polyfunctional compound which is acrylurethane as a reaction product of pentaerythritol or a hydroxyl group-containing poly(meth)acrylate of polypentaerythritol and a polyisocyanate, and which has at least 2, more preferably from 4 to 20, (meth)acryloyl groups.

Further, a pentaerythritol type poly(meth)acrylate or an isocyanurate type poly(meth)acrylate may be mentioned. Here, the pentaerythritol type poly(meth)acrylate is meant for a polyester of pentaerythritol or polypentaerythritol with (meth)acrylic acid, which has preferably from 4 to 20 (meth)acryloyl groups. Specifically, trimethylolpropane tri(meth)acrylate, pentaerythritol tri(meth)acrylate, pentaerythritol tetra(meth)acrylate, dipentaerythritol hexa(meth)acrylate or dipentaerythritol penta(meth)acrylate may be mentioned. Further, the isocyanurate type poly(meth)acrylate is meant for a polyester of a compound obtainable by adding 1 to 6 mol of caprolactone or an alkylene oxide to 1 mol of tris(hydroxyalkyl)isocyanurate or tris(hydroxyalkyl)isocyanurate, with (meth)acrylic acid, which has preferably from 2 to 3 (meth)acryloyl groups.

The mixture (A) of compounds each having a (meth)acryloyl group, may contain a compound (A4) having one (meth)acryloyl group in its molecule. The compound (A4) may be a (meth)acrylate such as an alkyl(meth)acrylate or an allyl (meth)acrylate.

The coating composition of the present invention contains a colloidal silica (B). The colloidal silica (B) is ultrafine particles of silica dispersed in a dispersion medium in the form of colloid. The average particle size of the particles of the colloidal silica (B) is not particularly limited, but is preferably from 1 to 200 nm, more preferably from 1 to 50 nm, in order to attain high transparency of the coating film made of the cured product.

As the colloidal silica, it is possible to use one dispersed in the following dispersion medium. Specifically, water, methanol, ethanol, isopropanol, n-butanol, ethylene glycol, methyl cellosolve, ethyl cellosolve, butyl cellosolve, propylene glycol monomethyl ether acetate, dimethylacetamide, toluene, xylene, methyl acetate, ethyl acetate, butyl acetate, pentyl acetate or acetone may, for example, be mentioned. Water, a lower alcohol, an ester, a cellosolve or the like is preferred since dispersion stability of the sol can be secured because its polarity is high to some extent.

As the colloidal silica (B), in order to improve the dispersion stability, it is possible to use a modified colloidal silica, the surface of which is modified with a hydrolysate of a hydrolysable silane compound. Here, "modified with a hydrolysate" means such a state that a hydrolysate of a silane compound is physically or chemically bonded to a part or all of silanol groups on the surface of the colloidal silica particles, whereby the surface characteristics are improved. Silica particles, to the surface of which a hydrolysate which further undergoes a condensation reaction is similarly bonded, are also included. This surface modification can readily be carried out by subjecting a part or all of hydrolysable groups of the silane compound to hydrolysis or to hydrolysis and a condensation reaction in the presence of the colloidal silica particles.

The hydrolysable silane compound is preferably a silane compound wherein an organic group having a functional group such as a (meth)acryloyl group, an amino group, an epoxy group or a mercapto group, and a hydrolysable group such as an alkoxy group and/or a hydroxyl group, are bonded to a silicon atom. Preferably, it may, for example, be 3-(meth)acryloyloxypropyl trimethoxysilane, 2-(meth)acryloyloxyethyl trimethoxysilane, 3-(meth)acryloyoxypropyl triethoxysilane, 2-(meth)acryloyloxyethyl triethoxysilane, 3-aminopropyl triethoxysilane, 3-aminopropyl trimethoxysilane, N-(2-aminoethyl)-3-aminopropylmethyl dimethoxysilane, 3-glycidoxypropyl trimethoxysilane or 3-mercaptopropyl trimethoxysilane.

The colloidal silica (B) is preferably incorporated in an amount of from 0.1 to 500 parts by mass as a solid content, per 100 parts by mass of the mixture (A) of compounds each having a (meth)acryloyl group. It is more preferably from 0.1 to 300 parts by mass, particularly preferably from 10 to 200 parts by mass. When the amount is within this range, the coating film made of the cured product will have sufficient abrasion resistance, haze is less likely to occur, and cracks or the like due to an external force are less likely to occur.

The coating composition contains an active energy ray polymerization initiator (C) in an amount of preferably from 0.1 to 20 parts by mass, more preferably from 0.2 to 10 parts by mass, per 100 parts by mass of the mixture (A) of compounds each having a (meth)acryloyl group. When the amount of the active energy ray polymerization initiator (D) is within this range, the curing properties will be sufficient, and all the active energy ray polymerization initiator (D) will decompose at the time of curing.

The active energy ray polymerization initiator (C) widely includes known photopolymerization initiators. Specifically, it may, for example, be an arylketone type photopolymerization initiator (such as an acetophenone, a benzophenone, an alkylaminobenzophenone, a benzyl, a benzoin, a benzoin ether, a benzyldimethyl ketal, a benzoyl benzoate or an α-acyloxime ester), a sulfur-containing photopolymerization initiator (such as a sulfide or a thioxanthone), an acylphosphine oxide (such as an acyldiarylphosphine oxide) or other photopolymerization initiators. The photopolymerization initiators may be used as a mixture of at least two types thereof in combination. Further, the photopolymerization initiator may be used in combination with a photosensitizer such as an amine.

The coating composition of the present invention may contain, as the case requires, at least one functional compounding agent selected from the group consisting of an organic solvent, an ultraviolet observer, a photosensitizer, an antioxidant, a thermal polymerization inhibitor, a leveling agent, a defoaming agent, a thickener, a sedimentation-preventing agent, a pigment (organic coloring pigment, inorganic pigment), a coloring dye, an infrared absorber, a fluorescent brighter, a dispersant, an anti-fogging agent, and a coupling agent.

The coating composition of the present invention is applied on a substrate by a method such as dip coating, spin coating, flow coating, spray coating, bar coating, gravure coating, roll coating, blade coating or air knife coating, and dried in the case where the composition contains an organic solvent, and then irradiated with active energy rays and cured.

The active energy rays may, for example, be preferably ultraviolet rays, electron rays, X-rays, radioactive rays or high frequency waves. Ultraviolet rays having a wavelength of from 180 to 500 nm are particularly preferred from economical viewpoint.

The thickness of the coating film made of the cured product of the coating composition may be variously changed as required. Usually, the thickness of the coating film is preferably from 0.1 to 50 µm, more preferably from 0.2 to 20 µm, particularly preferably from 0.3 to 10 µm. If the thickness of the coating film is within this range, the abrasion resistance will be sufficient, and even the deep portion of the coating film will be sufficiently cured.

The material for the substrate on which the coating film made of the cured product of the coating composition of the present invention is formed, may, for example, be a plastic material such as an aromatic polycarbonate, polyethylene terephthalate, polybutylene terephthalate, polymethyl methacrylate, polymethacrylimide, polystyrene, polyvinyl chloride, unsaturated polyester, polyolefin, an ABS resin, an AS resin or a MS (methyl methacrylate/styrene) resin. The coating film may be present directly on the substrate, or an intermediate layer may be present between the substrate and the coating film.

EXAMPLES

Now, the present invention will be described with reference to Examples of the present invention (Examples 1 to 6) and Comparative Examples (Examples 7 to 11), however, the present invention is not limited thereto. The number average molecular weight is a value measured by means of gel permeation chromatography employing polystyrene as a standard substance.

Preparation Example 1

Compound (A1-1)

Into a 1 L four-necked flask equipped with a stirrer and a condenser, 2,2'-azobisisobutyronitrile (2.67 g) and octylmercaptane (2.38 g) were charged, and then methanol (189 g) was added to dissolve them. Then, 2-methacryloyloxyethyltrimethylammonium chloride (30.00 g) and a compound (tradename: PLACCEL FA2D, manufactured by DAICEL CHEMICAL INDUSTRIES, CO., LTD., 64.74 g) having an average of 2 mol of ε-caprolactone added to 1 mol of 2-hydroxyethyl acrylate, were added, followed by stirring at 65° C. for 6 hours.

Then, the condenser was replaced with a fractionating column, and cyclohexanone (184.85 g) was added, followed by heating at 100° C., to distill all of methanol off from the system. Then, the reaction solution was cooled to room temperature, and then 2,6-di-t-butyl-p-cresol (2.13 g) and dibutyltin dilaurate (0.31 g) were added, and finally 2-methacryloyloxyethyl isocyanate (21.00 g) was added, followed by stirring for 12 hours at room temperature, to obtain a cyclohexanone solution of colorless transparent copolymer (A1-1) having an average molecular weight of 7,000 (40% solid content).

Preparation Examples 2 to 7

Compounds (A1-2 to A1-7)

Compounds (A1-2 to A1-7) were produced in the same manner as in the preparation method of the compound (A1-1) except that the types and amounts of the monomers, solvent, additives, etc. in the preparation method of the compound (A1-1) were changed to the types and amounts as identified in the following Table 1. Here, in Table 1, PLACCEL FA1 is meant for a compound (tradename: PLACCEL FA1, manufactured by DAICEL CHEMICAL INDUSTRIES, CO., LTD.), having 1 mol of ε-caprolactone added to 1 mol of 2-hydroxyethyl acrylate.

Preparation Example 8

Compound (A1-8)

Into a 1 L four-necked flask equipped with a stirrer and a condenser, 2,2'-azobisisobutyronitrile (4.11 g) and octylmercaptan (3.66 g) were charged, and then cyclohexanone (270 g) was added to dissolve them. Then, N,N-dimethylaminoethyl methacrylate (35.10 g) and a compound (tradename: PLACCEL FA2D, manufactured by DAICEL CHEMICAL Into a 1 L four-necked flask equipped with a stirrer and a condenser, 2,2'-azobisisobutyronitrile (1.64 g) and octylmercaptane (1.46 g) were charged, and then methanol (288 g) was added to dissolve them. Then, 2-methacryloyloxyethyl trimethylammonium chloride (41.50 g), 2-hydroxyethyl methacrylate (26.02 g) and isobornyl acrylate (124.80 g) were added, followed by stirring for 6 hours at 65° C. Then, the methanol was distilled off from the reaction solution, followed by vacuum drying for 12 hours at 70° C. It was attempted to dissolve the solid polymer thus obtained in various organic solvent having no active hydrogen, but the polymer could not be dissolved, and the methacryloyl-modification reaction of the copolymer had to be given up.

A summary of the compounds (A1-1 to A1-8) is shown in Table 1.

TABLE 1

|  | Preparation Example | | | | | | | |
| --- | --- | --- | --- | --- | --- | --- | --- | --- |
|  | 1 | 2 | 3 | 4 | 5 | 6 | 7 | 8 |
| Copolymer (A1) | A1-1 | A1-2 | A1-3 | A1-4 | A1-5 | A1-6 | A1-7 | A1-8 |
| <Copolymerization reaction> | | | | | | | | |
| Monomer (a1) 2-Methacryloyloxyethyl trimethylammonium chloride | 30.00 | 30.00 | 49.80 | 41.50 | 24.90 | 60.00 | 30.00 | — |
| Monomer (a2) (or Monomer (a3))     PLACCEL FA2D | 64.74 | 51.82 | 42.96 | — | 64.44 | 41.45 | 64.74 | 99.73 |
|                                     PLACCEL FA1 | — | — | — | 61.07 | — | — | — | — |
| Monomer (a1') N,N-dimethylaminoethyl methacrylate | — | — | — | — | — | — | — | 35.10 |
| Monomer (a4)   Isobornyl acrylate | — | 15.06 | — | — | 37.44 | — | — | — |
|                2-Ethylhexyl acrylate | — | — | 44.23 | — | — | — | — | — |
| Azobisisobutyronitrile | 2.67 | 5.94 | 0.98 | 2.96 | 0.79 | 1.66 | 2.67 | 4.11 |
| Octylmercaptan | 2.38 | 5.29 | 0.88 | 2.63 | 0.70 | 1.48 | 2.38 | 3.66 |
| Methanol | 189 | 204 | 205 | 154 | 190 | 189 | 142 | — |
| Cyclohexanone | — | — | — | — | — | — | — | 270 |
| <Modification reaction> | | | | | | | | |
| Compound (c) 2-Methacryloyloxyethyl isocyanate | 21.00 | 11.20 | 9.30 | 23.25 | 16.74 | 11.83 | 28.06 | 23.72 |
| Cyclohexanone | 184.85 | — | 223 | 200 | 221 | 176 | — | — |
| Tetrahydrofuran | — | 180 | — | — | — | — | 196 | — |
| 2,6-Di-t-butyl-p-cresol | 2.13 | 0.83 | 0.70 | 1.75 | 2.09 | 1.06 | 2.10 | 1.80 |
| Dibutyltin dilaurate | 0.31 | 0.17 | 0.14 | 0.35 | 0.42 | 0.15 | 0.42 | 0.35 |
| <Modification reaction> | | | | | | | | |
| Alkylating agent (d) Chloromethyl acetate | — | — | — | — | — | — | — | 24.16 |
| Weight average molecular weight | 7000 | 9000 | 9000 | 5500 | 11000 | 7000 | 6000 | 8000 |
| Solid content (%) | 40 | 40 | 40 | 40 | 40 | 40 | 40 | 42 |
| (a1)/{(a) + (c)} × 100 (parts by mass) | 25.9 | 27.8 | 34.0 | 33.0 | 17.3 | 53.0 | 24.4 | 32.4 (*1) |
| (Total amount of NCO in (b)/total amount of OH in (a2) (mol %) | 75 | 50 | 50 | 60 | 60 | 65 | 100 | 55 |

(*1) Calculated by the formula: {(a1') + (d)}/{(a) + (d) + (c)} × 100

INDUSTRIES, LTD.) (99.73 g) having an average of 2 mol of ε-caprolactone added to 1 mol of 2-hydroxyethyl acrylate, were added, followed by stirring at 80° C. for 6 hours.

Then, after the reaction solution was cooled to room temperature, 2,6-di-t-butyl-p-cresol (1.80 g) and dibutyltin dilaurate (0.35 g) were added, and finally 2-methacryloyloxyethyl isocyanate (23.72 g) was added, followed by stirring for 12 hours at room temperature. Then, methyl chloroacetate (24.16 g) was added, followed by stirring for 4 hours at 60° C., to obtain a cyclohexanone solution of luteofulvous transparent copolymer (A1-8) having a weight average molecular weight of 8,000 (42% solid content).

Preparation Example 9

Example in which the Copolymer does not have the Structure Represented by the above Formula 1

Preparation Example 10

Colloidal Silica (B-1)

To 2-propanol dispersion type colloidal silica (silica content: 30%, average particle size: 11 nm) (100 parts by mass), 3-mercaptopropyl trimethoxysilane (2.5 parts by mass) was added and stirred at 50° C. for 3 hours, followed by aging at room temperature for 12 hours, to obtain a dispersion of colloidal silica (B-1) having a hydrolyzed condensate of a mercapto group-containing silane compound on its surface (solid content: 31.7%).

Preparation Example 11

Colloidal Silica (B-2)

To 2-propanol dispersion type colloidal silica (silica content: 30%, average particle size: 11 nm) (100 parts by mass), 3-methacryloyloxypropyl trimethoxysilane (5.0 parts by mass) was added and stirred at 50° C. for 3 hours, followed by aging at room temperature for 12 hours, to obtain a dispersion of colloidal silica (B-2) having a hydrolyzed condensate of a mercapto group-containing silane compound on its surface (solid content 33.3%).

Preparation Example 12

Compound (A2-1) (Compound to Impart Surface Lubricity)
Into a 300 mL four-necked flask equipped with a stirrer and a condenser, titanium tetraisobutoxide (80 mg), a dimethylsilicone oil having a hydroxyl group at one terminal (tradename: X-22-170BX, manufactured by Shin-Etsu Chemical Co., Ltd., hydroxyl value: 18.5) (100 g) and ε-caprolactone (25 g) were added, followed by stirring at 150° C. for 5 hours, to obtain a white waxy compound having ε-caprolactone added by ring-opening at one terminal of the dimethylsilicone oil. The average polymerization degree of the caprolactone was 6.6.

The compound obtained was cooled to room temperature, butyl acetate (50 g) and 2,6-di-t-butyl-p-cresol (250 mg) were added thereto, followed by stirring for 30 minutes, and then 2-methacryloyloxyethyl isocyanate (5.05 g) was added, followed by stirring at room temperature further for 24 hours, to obtain a butyl acetate solution (solid content: 72%) of the compound (A2-1) having its terminal modified with a methacryloyl group. The number average molecular weight thereof was about 3,750.

Preparation Example 13

Compound (A2-2) (a Compound to Impart Surface Lubricity and Fingerprint Resistance)
In the following description, tetramethylsilane will be referred to as TMS, $CClF_2CF_2CHClF$ will be referred to as R-225, and $CCl_2FCClF_2$ will be referred to as R-113.

(Step 1) Into a 200 mL flask equipped with a thermometer, a stirrer, a reflux tube and a temperature controlling device, a commercially available polyoxyethylene glycol monomethyl ether $(CH_3O(CH_2CH_2O)_{q+1}H$, q≈7.3 (average value)) (25.0 g), R-225 (20.0 g), sodium fluoride (1.2 g) and pyridine (1.6 g) were put and vigorously stirred while keeping the internal temperature to at most 10° C., and nitrogen gas was bubbled. Further, $FCOCF(CF_3)OCF_2CF(CF_3)OCF_2CF_2CF_3$ (46.6 g) was dropwise added over a period of 3.0 hours while keeping the internal temperature to at most 5° C. Then, stirring was carried out at 50° C. for 12 hours and then at room temperature for 24 hours to obtain a crude liquid. The crude liquid thus obtained was subjected to filtration under reduced pressure, and then the filtrate was dried in a vacuum dryer at 50° C. and under 666.5 Pa for 12 hours. The crude liquid thus obtained was dissolved in R-225 (100 mL), washed with a saturated sodium bicarbonate aqueous solution (1,000 mL) for three times to recover an organic phase. Magnesium sulfate (1.0 g) was added to the organic phase recovered, followed by stirring for 12 hours. Then, pressure filtration was carried out to remove magnesium sulfate, and R-225 was distilled off by an evaporator to obtain a compound (56.1 g) which was liquid at room temperature. As a result of $^1$H-NMR and $^{19}$F-NMR analyses, the polymer obtained was confirmed to be a compound represented by $CH_3O(CH_2CH_2O)_{q+1}COCF(CF_3)OCF_2CF(CF_3)OCF_2CF_2CF_3$ (q is as defined above).

(Step 2) R-113 (1,560 g) was put in a 3 L reactor made of hastelloy, stirred and kept at 25° C. At a gas outlet of the reactor, a condenser kept at 20° C., a NaF pellet packed bed and a condenser kept at –20° C. were disposed in series. Here, a liquid return line was disposed to return the condensed liquid from the condenser kept at –20° C. to the reactor. Nitrogen gas was blown for 1.0 hour, and then fluorine gas diluted to 10% with nitrogen gas (hereinafter referred to as the 10% fluorine gas) was blown at a flow rate of 24.8 L/h for 1 hour.

Then, while the 10% fluorine gas was blown at the same flow rate, a solution having the product (27.5 g) obtained in Step 1 dissolved in R-113 (1,350 g) was injected over a period of 30 hours.

Then, the internal temperature was changed to 40° C., and while the 10% fluorine gas was blown at the same flow rate, an R-113 solution (12 mL) containing 6.7% of the product obtained in Step 1 was injected. Then, an R-113 solution (6 mL) having benzene dissolved at a concentration of 1% was injected. Further, the 10% fluorine gas was blown for 1 hour at the same flow rate, and then nitrogen gas was blown for 1 hour.

After completion of the reaction, the solvent was distilled off by vacuum drying at 60° C. for 6 hours to obtain a product (45.4 g) which was liquid at room temperature. As a result of NMR analysis, a compound represented by $CF_3O(CF_2CF_2O)_{q+1}COCF(CF_3)OCF_2CF(CF_3)OCF_2CF_2CF_3$ was confirmed to be the main product.

(Step 3) A 300 mL round flask into which a stirrer chip was put, was sufficiently flushed with nitrogen, then, methanol (36.0 g), sodium fluoride (5.6 g) and R-225 (50.0 g) were put therein, and the product (43.5 g) obtained in Step 2 was dropwise added, followed by vigorous stirring while bubbling was carried out at room temperature. Here, nitrogen sealing was applied to the round flask outlet.

8 Hours later, excess methanol and reaction by-products were distilled off by keeping the interior of the system under reduced pressure by a vacuum pump installed on the condenser. 24 Hours later, a product (26.8 g) which was liquid at room temperature was obtained. As a result of NMR analysis, a compound represented by $CF_3O(CF_2CF_2O)_qCF_2COOCH_3$ was confirmed to be the main product.

(Step 4) A 300 mL round flask into which a stirrer chip was put, was sufficiently flushed with nitrogen. 2-Propanol (30.0 g), R-225 (50.0 g) and sodium tetrahydroborate (4.1 g) were added, and the product (26.2 g) obtained in Step 3 was diluted with R-225 (30.0 g) and dropwise added thereto, followed by vigorous stirred at room temperature. Here, nitrogen sealing was applied to the round flask outlet.

8 Hours later, the solvent was distilled off by keeping the interior of the system under reduced pressure by a vacuum pump installed on the condenser. 24 Hours later, the resultant was transferred to a 1 L round flask, R-225 (100 g) was added thereto, and a 0.2 mol/L hydrochloric acid aqueous solution (500 g) was dropwise added with stirring. After the dropwise addition, stirring was continued for 6 hours. The resulting organic phase was washed three times with distilled water (500 g), and the organic phase was recovered. Further, magnesium sulfate (1.0 g) was added to the recovered organic phase, followed by stirring for 12 hours. Then, pressure filtration was carried out to remove magnesium sulfate, and R-225 was distilled off by an evaporator to obtain a material (24.8 g) which was liquid at room temperature. As a result of NMR analysis, a compound represented by $CF_3O(CF_2CF_2O)_q CF_2CH_2OH$ was confirmed to be the main product.

(Step 5) Into a 200 mL four-necked flask equipped with a stirrer and a condenser, titanium tetraisobutoxide is (16 mg), $CF_3O(CF_2CF_2O)_qCF_2CH_2OH$ (20 g) and ε-caprolactone (5 g) were added, followed by heating at 150° C. for 5 hours, to obtain a white waxy compound having ε-caprolactone added by ring-opening to the terminal of $CF_3O(CF_2CF_2O)_q CF_2CH_2OH$. The molecular weight thereof was 1,250, and the polymerization number of caprolactone was about 2.2.

Then, 1,3-bis(trifluoromethyl)benzene (12 g) and 2,6-di-t-butyl-p-cresol (12 mg) were added, followed by stirring for 30 minutes, and then 2-methacryloyloxyethyl isocyanate (3.1 g) was added, followed by stirring at room temperature for further 24 hours, to complete the reaction. Then, 1,3-bis(tirfluoromethyl)benzene as the solvent was distilled off at 40° C. under reduced pressure, to obtain a compound (A2-2) having its terminal modified with a methacryloyl group. The molecular weight was 1,400.

Preparation Example 14

Compound (A2-3) (Compound to Impart Fingerprint Resistance)

$CF_3O(CF_2CF_2O)_qCF_2CH_2OH$ was obtained by using $CH_3O(CH_2CH_2O)_{q+1}H$ (q=2.3 (average value)), in the same manner as in PREPARATION EXAMPLE 13.

Into a 300 mL four-necked flask equipped with a stirrer and a condenser, titanium tetraisobutoxide (80 mg), $CF_3O (CF_2CF_2O)_qCF_2CH_2OH$ (100 g) and 25 g of ε-caprolactone were added, followed by heating at 150° C. for 5 hours, to obtain a white waxy compound having ε-caprolactone added by ring-opening to a terminal of $CF_3O(CF_2CF_2O)_q CF_2CH_2OH$. The molecular weight was 580, and the polymerization number of caprolactone was about 1.0.

The compound obtained was cooled to room temperature, and butyl acetate (56 g) and 2,6-di-t-butyl-p-cresol (60 mg) were added thereto, followed by stirring for 30 minutes, and then 2-methacryloyloxyethyl isocyanate (6.0 g) was added thereto, followed by stirring at room temperature for further 24 hours, to obtain a butyl acetate solution (solid content: 70%) of the compound (A2-3) having its terminal modified with a methacryloyl group. The molecular weight was 630.

Example 1

Into a 300 mL four-necked flask equipped with a stirrer and a condenser, 1-hydroxycyclohexyl phenyl ketone (2.68 g), hydroquinone monomethyl ether (0.83 g), the solution (0.20 g) of the compound (A2-1) and the solution (0.20 g) of the compound (A2-3) were charged, and then the dispersion (76.38 g) of the colloidal silica (B-2) was slowly added and stirred for 1 hour at room temperature in a light shielding state for homogenization. Then, with stirring, the solution (30.88 g) of the compound (A1-1) was added thereto, cyclohexanone (20.14 g) and 2-propanol (27.72 g) were further added thereto, followed by stirring for 1 hour at room temperature in a light shielding state for homogenization. Then, pentaerythritol triacrylate (8.24 g) and dipentaerythritol hexaacrylate (32.94 g) were added, followed by stirring for 1 hour at room temperature in a light shielding state to obtain a coating composition (solid content: 42%).

The coating composition obtained was spin-coated (2,000 rpm for 10 seconds) on the surface of a substrate (a transparent sheet made of an aromatic polycarbonate resin with a thickness of 3 mm, 100 mm×100 mm), and dried in a hot air circulating oven at 90° C. for 1 minute, to form a coating film. Then, the coating film was cured by irradiation with ultraviolet rays of 1,000 mJ/cm$^2$ (integrated energy amount of ultraviolet rays in a wavelength region of from 300 to 390 nm, the same applies hereinafter) using a high-pressure mercury lamp, to form a coating film made of a cured product with a thickness of 1.2 μm, thereby to obtain a sample 1 having the coating film made of the cured product on the surface of the substrate.

Examples 2 to 11

Samples 2 to 11 were produced in the same manner as in Example 1 except that the types and amounts of the mixture (A), the colloidal silica (B) and the solvent in Example 1 were changed to the types and amounts as defined in the following Table 2.

With respect to the above Samples 1 to 11, measurement and evaluation of various physical properties were carried out by the following methods, and the results are shown in Table 2.

Antistatic Property

To an initial sample and a sample after moisture resistance test (after stored in an atmosphere at 80° C. under a humidity of 90% for 500 hours), high voltage (10 kV) was applied for a predetermined time for electrical charging by a method as defined by JIS K1049, and then the time until the charged voltage fell off to ½ was measured. Here, STATIC HONESTMETER manufactured by SHISHIDO ELECTROSTATIC, CO., LTD. was used for the measurement.

Appearance After a Moisture Resistance Test

Comparison with the state of an initial sample was made, whereby a case where no change was observed in appearance of whitening, bleeding, and peeling etc., was identified with symbol ○.

Transparency

The haze values (%) at four points of a sample were measured by a haze meter, and the average value was calculated.

Abrasion Resistance

In accordance with the abrasion resistance test method as defined by ISO9352, two CS-10F abrasive wheels each combined with a weight of 500 g were rotated 500 times, whereupon the haze was measured by a haze meter. The measurement of the haze values was carried out at four points on the cycle orbit of the abrasive wheels, and the average value was calculated. The abrasion resistance was represented by the value (%) of (haze after abrasion test)-(initial haze).

Surface Lubricity

With respect to an initial sample and a sample after moisture resistance test (after stored in an atmosphere at 80° C. under a humidity of 90% for 500 hours), the coefficient of dynamic friction on the surface of each sample was measured by the following procedure. The coefficient of dynamic friction was obtained by measuring, under the following conditions, the weight (g) of the sliding piece required to horizontally move the load, and represented by "the required weight/load".

Test pad: non-woven fabric made of cellulose (BEMCOT, manufactured by Asahi Kasei, Ltd.)
Load: 500 g (area of contact 50 mm×100 mm)
Moving distance 20 mm
Moving rate: 10 mm/min
Test environment: 25° C., relative humidity of 45%

Fingerprint Resistance

With respect to an initial sample and a sample after moisture resistance test (after stored in an atmosphere at 80° C. under a humidity of 90% for 50 hours), the contact angle to oleic acid as one of sebum components of human was measured as an index for fingerprint resistance. The higher the fingerprint resistance on the surface is, the higher the contact angle to the oleic acid becomes.

Using an automatic contact angle meter (DSA10D02: manufactured by KRUSS Co., Ltd., Germany), a droplet of 3 µL of oleic acid was formed on a needlepoint in a dry state (20° C., relative humidity: 65%), which was brought into contact with the surface of the sample to form a droplet. The contact angle is an angle between the solid surface and the tangent of the liquid surface at a point where the solid and the liquid are in contact, and defined as the angle at the side containing the liquid.

The entire disclosure of Japanese Patent Application No. 2004-091995 filed on Mar. 26, 2004 including specification, claims and summary is incorporated herein by reference in its entirety.

What is claimed is:

1. An active energy ray curable coating composition comprising a mixture (A) of compounds each having a (meth)acryloyl group, and a colloidal silica (B), characterized in that the mixture (A) contains from 22 to 62% of a copolymer (A1) which has a structure in which an isocyanate group of a compound (c) having the isocyanate group and a (meth)acry-

TABLE 2

| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|
| Mixture (A) | (A1-1) solution | 30.88 | 80.29 | | | | | 27.61 | 105.6 | | | |
| | (A1-2) solution | | | 30.88 | | | | | | | | |
| | (A1-3) solution | | | | 30.88 | | | | | | | |
| | (A1-4) solution | | | | | 30.88 | | | | | | |
| | (A1-5) solution | | | | | | | | | 30.88 | | |
| | (A1-6) solution | | | | | | | | | | 30.88 | |
| | (A1-7) solution | | | | | | | | | | | 30.88 |
| | (A1-8) solution | | | | | | 33.80 | | | | | |
| | (A2-1) solution | 0.20 | | | | | 0.20 | | 0.20 | | 0.20 | |
| | (A2-2) | | 0.20 | 0.20 | 0.20 | 0.20 | | | 0.20 | | 0.20 | 0.20 |
| | (A2-3) solution | 0.20 | | | | | | | | | | |
| | Pentaerythritol acrylate | 8.24 | 4.28 | 8.24 | 8.24 | 8.24 | 8.61 | 8.50 | 4.83 | 8.24 | 8.24 | 8.24 |
| | Dipentaerythritol hexaacrylate | 32.94 | 17.13 | 32.94 | 32.94 | 32.94 | 34.42 | 33.99 | 19.31 | 32.94 | 32.94 | 32.94 |
| Colloidal silica (B) | (B-1) dispersion | | | | | | 65.32 | | 37.89 | | | |
| | (B-2) dispersion | 76.38 | 76.38 | 76.38 | 76.38 | 76.38 | | 76.38 | | 76.38 | 76.38 | 76.38 |
| Solvent | Cyclohexanone | 20.14 | 15.21 | | 20.14 | 20.14 | 19.06 | 46.82 | | 20.14 | 20.14 | 20.14 |
| | 2-Propanol | 27.72 | 2.99 | 46.55 | 27.72 | 27.72 | 34.90 | 2.99 | 28.00 | 27.72 | 27.72 | 27.72 |
| A1/A (%) | | 23.0 | 59.8 | 23.0 | 23.0 | 23.0 | 24.7 | 20.6 | 63.5 | 23.0 | 23.0 | 23.0 |
| Antistatic property (sec) | Initial | 160 | 2 | 250 | 3 | 4 | 550 | 2450 | ≦1 sec | 2100 | 50 | 1200 |
| | After a moisture resistance test | 150 | 2 | 190 | 2 | 4 | 480 | 2250 | ≦1 sec | 2050 | 30 | 1150 |
| Appearance after a moisture resistance test | | ◯ | ◯ | ◯ | ◯ | ◯ | ◯ | ◯ | Bleeding | ◯ | ◯ | ◯ |
| Transparency (%) | | 0.2 | 0.2 | 0.2 | 0.2 | 0.8 | 0.2 | 0.2 | 0.2 | 0.2 | 2.2 | 0.2 |
| Abrasion resistance (%) | | 2.9 | 4.8 | 3.3 | 4.5 | 4.2 | 3.1 | 3 | 20.1 | 3.6 | 3.6 | 2.9 |
| Surface lubricity | Initial | 0.03 | 0.07 | 0.05 | 0.06 | 0.06 | 0.04 | 0.06 | 0.05 | 0.06 | 0.07 | 0.06 |
| | After moisture resistance test | 0.04 | 0.07 | 0.06 | 0.07 | 0.06 | 0.05 | 0.06 | 1.2 | 0.07 | 0.07 | 0.06 |
| Resistance to attachment of fingerprints (°) | Initial | 73 | 72 | 71 | 72 | — | — | 72 | — | 72 | — | 72 |
| | After a moisture resistance test | 72 | 70 | 70 | 70 | — | — | 71 | — | 71 | — | 71 |

In Example 7, the proportion of the copolymer (A1) in the mixture (A) was too small, whereby the antistatic property was poor. In Example 8, the proportion of the copolymer (A1) in the mixture (A) was too large, whereby the abrasion resistance was poor, and bleeding of the copolymer (A1) was observed on the surface of the sample after moisture resistance test. In Example 9, the proportion of monomer units each having a quaternary ammonium salt group in the copolymer (A1) was too small, whereby the antistatic property was poor. In Example 10, the proportion of monomer units each having a quaternary ammonium salt group in the copolymer (A1) was too large, whereby the transparency was poor. In Example 11, a remaining hydroxyl group was not present, whereby the antistatic property was poor.

INDUSTRIAL APPLICABILITY

A molded product having a coating film made of a cured product of the active energy ray curable coating composition of the present invention on the surface of a substrate, is suitable for a display or an optical disk.

loyl group in its molecule is addition-reacted with hydroxyl groups of a polymer (b) obtainable by reacting a radical polymerizable monomer mixture (a) comprising a radical polymerizable monomer (a1) having a quaternary ammonium salt group, a radical polymerizable monomer (a2) having a hydroxyl group and a radical polymerizable monomer (a3) having a structure represented by the following formula 1:

$$-(C(=O)C_mH_{2m}O)_n-\qquad \text{Formula 1}$$

(in the formula 1, m is an integer of from 3 to 5, and n is an integer of from 1 to 10), wherein the monomer (a1) is in a proportion of from 20 to 45 parts by mass per 100 parts by mass of the total amount of the monomer mixture (a) and the compound (c), and the isocyanate group of the compound (c) is reacted with 20 to 85 mol % of hydroxyl groups in the monomer mixture (a).

2. The active energy ray curable coating composition according to claim 1, wherein the monomer (a1) is in a proportion of from 23 to 40 parts by mass per 100 parts by mass of the total amount of the monomer mixture (a) and the compound (c).

3. The active energy ray curable coating composition according to claim 1, wherein the isocyanate group of the compound (c) is reacted with 30 to 80 mol % of hydroxyl groups in the monomer mixture (a).

4. The active energy ray curable coating composition according to claim 1, wherein the isocyanate group of the compound (c) is reacted with 40 to 75 mol % of hydroxyl groups in the monomer mixture (a).

5. The active energy ray curable coating composition according to claim 1, wherein the colloidal silica (B) is incorporated in an amount of from 0.1 to 500 parts by mass as a solid content, per 100 parts by mass of the mixture (A) of compounds each having a (meth)acryloyl group.

6. The coating composition according to claim 1, wherein the mixture (A) of compounds each having a (meth)acryloyl group, contains 0.01 to 10% of a compound (A2) having at least one moiety ($\alpha$) selected from the group consisting of moieties represented by the following formulae 2 to 6 and at least one moiety ($\beta$) selected from the group consisting of moieties represented by the following formulae 7 to 9, in its molecule:

$$-(SiR^1R^2O)_p-\quad\text{Formula 2}$$

$$-(CF_2CF_2O)_q-\quad\text{Formula 3}$$

$$-(CF_2CF(CF_3)O)_r-\quad\text{Formula 4}$$

$$-(CF_2CF_2CF_2O)_s-\quad\text{Formula 5}$$

$$-(CF_2O)_t-\quad\text{Formula 6}$$

(in the formula 2, each of $R^1$ and $R^2$ which are independent of each other, is a $C_{1-8}$ alkyl group, a $C_{1-8}$ fluoroalkyl group or a phenyl group, p is an integer of from 1 to 1000, and in the formulae 3 to 6, q, r, s and t are integers of from 1 to 100, respectively)

$$-R^3-\quad\text{Formula 7}$$

$$-(CH_2CH_2O)_x-(CH_2CH(CH_3)O)_y-\quad\text{Formula 8}$$

$$-(C(=O)C_uH_{2u}O)_z-\quad\text{Formula 9}$$

(in the formula 7, $R^3$ is a $C_{6-20}$ alkylene group, in the formula 8, x is an integer of from 0 to 100, y is an integer of from 0 to 100 and $5 \leq x+y \leq 100$, and in the formula 9, u is an integer of from 3 to 5 and z is an integer of from 1 to 20).

7. The coating composition according to claim 6, wherein the above compound (A2) is represented by any one of the following formulae:

$$R^5(SiR^1R^2O)_p-SiR^1R^2CH_2CH_2CH_2O-B-(CH_2CH_2O)_x-(CH_2CH(CH_3)O)_y-A$$

$$R^5(SiR^1R^2O)_p-SiR^1R^2CH_2CH_2CH_2O-B-(C(=O)C_uH_{2u}O)_z-A$$

In the above,
A: $-CONH-CH_2CH_2OCOC(R^4)=CH_2$ ($R^4$ is $-H$ or $-CH_3$),
B: single bond, $-CH_2CH_2O-$, $-CONH-C_6H_4-CH_2-C_6H_4-NHCOO-$, $-CONH-CH_2CH_2CH_2CH_2CH_2CH_2-NHCOO-$, $-CONH-C_6H_3(CH_3)-NHCOO-$, $-CONH-C_{10}H_6-NHCOO-$, $-CO-C_6H_4-COO-$, $-CO-C_iH_{2i+1}-COO-$ (i is an integer of from 0 to 10),
$R^4$: Hydrogen atom or methyl group,
$R^5$: $C_{1-8}$ alkyl group (an etheric oxygen atom may be included).

8. The coating composition according to claim 6, wherein the above compound (A2) is represented by any one of the following formulae:

$$R^fO-(CF_2CF_2O)_q-(CF_2CH_2O-B-(CH_2CH_2O)_x-(CH_2CH(CH_3)O)_y-A$$

$$R^fO-(CF_2CF_2O)_q-(CF_2CH_2O-B-(C(=O)C_uH_{2u}O)_z-A$$

$$R^fO-(CF_2CF_2O)_q-(CF_2O)_t-CF_2CH_2O-B-(CH_2CH_2O)_x-(CH_2CH(CH_3)O)_y-A$$

$$R^fO-(CF_2CF_2O)_q-(CF_2O)_t-CF_2CH_2O-B-(C(=O)C_uH_{2u}O)_z-A$$

$$R^fO-(CF(CF_3)CF_2O)_r-CF(CF_3)CH_2O-B-(CH_2CH_2O)_x-(CH_2CH(CH_3)O)_y-A$$

$$R^fO-(CF(CF_3)CF_2O)_r-CF(CF_3)CH_2O-B-(C(=O)C_uH_{2u}O)_z-A$$

$$R^fO-(CF_2CF_2CF_2O)_s-CF_2CF_2CH_2O-B-(CH_2CH_2O)_x-(CH_2CH(CH_3)O)_y-A$$

$$R^fO-(CF_2CF_2CF_2O)_s-CF_2CF_2CH_2O-B-(C(=O)C_uH_{2u}O)_z-A$$

In the above,
A: $-CONH-CH_2CH_2OCOC(R^4)=CH_2$ ($R^4$ is $-H$ or $-CH_3$),
B: single bond, $-CH_2CH_2O-$, $-CONH-C_6H_4-CH_2-C_6H_4-NHCOO-$, $-CONH-CH_2CH_2CH_2CH_2CH_2CH_2-NHCOO-$, $-CONH-C_6H_3(CH_3)-NHCOO-$, $-CONH-C_{10}H_6-NHCOO-$, $-CO-C_6H_4-COO-$, $-CO-C_iH_{2i+1}-COO-$ (i is an integer of from 0 to 10),
$R^4$: Hydrogen atom or methyl group,
$R^f$: $C_{1-6}$ fluoroalkyl group (an etheric oxygen atom may be included), and the arrangement of each of $-(CF_2CF_2O)-$ units and $-(CF_2O)-$ units may be a block-form or a random-form.

9. A molded product which comprises a substrate and a coating film with a thickness of from 0.1 μm to 50 μm, made of a cured product of the coating composition as defined in claim 1, formed on the surface of the substrate.

* * * * *